(12) United States Patent
Abraham et al.

(10) Patent No.: US 6,286,464 B1
(45) Date of Patent: Sep. 11, 2001

(54) WATER HEATING SYSTEM

(75) Inventors: Anthony W. Abraham, Laguna Niguel; Raymond-Paul Joubran, Pasadena, both of CA (US)

(73) Assignee: Robertshaw Controls Company

( * ) Notice: Subject to any disclaimer, the term of this patent is extended or adjusted under 35 U.S.C. 154(b) by 0 days.

(21) Appl. No.: 09/591,209

(22) Filed: Jun. 9, 2000

(51) Int. Cl.⁷ .................................................. G05D 23/13
(52) U.S. Cl. ..................... 122/14.31; 122/507; 137/337; 236/12.12; 236/12.16
(58) Field of Search ..................... 122/14.1, 14.3, 122/14.31, 507; 126/362.1; 137/337; 236/12.12, 12.16

(56) References Cited

U.S. PATENT DOCUMENTS

| | | | |
|---|---|---|---|
| 3,958,555 | * | 5/1976 | Horne ................................. 122/14.3 |
| 4,611,757 | * | 9/1986 | Saether ............................... 236/12.12 |
| 5,400,961 | * | 3/1995 | Tsutsui et al. ....................... 236/12.12 |
| 5,503,183 | * | 4/1996 | Fenn et al. .......................... 236/12.12 |
| 5,623,990 | * | 4/1997 | Pirkle ................................. 236/12.2 |
| 6,059,193 | * | 5/2000 | Braathen ............................. 122/14.3 |

* cited by examiner

*Primary Examiner*—Gregory Wilson
(74) *Attorney, Agent, or Firm*—Fulwider Patton Lee & Utecht, LLP

(57) ABSTRACT

A water heating system in which the output water temperature is regulated by a mixing valve which allows the temperature of the water contained within the water heater to be maintained at a much higher temperature without compromising safety. Significantly more hot water is therefore available for use yet the maximum temperature supplied to the various points of usage are within the safe limits. The system can be additionally configured to supply unmixed hot water to points of usage where a higher temperature is needed and a user is not exposed to the water such as for example in a dishwasher.

20 Claims, 3 Drawing Sheets

WATER HEATING SYSTEM

BACKGROUND OF THE INVENTION

The present invention is generally directed to water heaters and more particularly pertains to enhancing the ability of a water heater to supply hot water.

Water heaters are typically controlled so as to limit the temperature of water contained therein to about 140° F. with the intent to reduce the likelihood of accidental scalding at the point of usage. While such a low set temperature may reduce the likelihood of injury, it does compromise the ability of a water heater of a given size to supply hot water. The heating capacity of most water heaters cannot keep up with the continuous withdrawal of hot water. As cold water replaces the hot water withdrawn from the heater, the temperature of the water within the water heater will gradually drop off thus reducing the output water temperature. The ability of a water heater to quickly recover its set temperature is further aggravated by the fact that the burner is not activated until the temperature of the water drops well below its set temperature. In order to reduce unnecessary cycling, the gas valve that controls the flow of gas to the burner is typically configured to maintain the water temperature within±12° F. As a result, a significant drop off of the water temperature will have occurred before the water heater even begins to heat the water.

Efforts to increase the ability of a water heater to satisfy the demand for hot water without raising the set temperature, have previously been limited to increasing the volume of the tank, increasing the heating capacity of the burner or both. However, the size of the space dedicated for the installation of a water heater in most residential applications limits the maximum size of the water heater. Moreover, a water heater with a larger tank and possibly a larger burner would significantly increase the cost of the water heater.

A water heating system is needed which is capable of providing an increased amount of hot water for a given tank volume and burner size without increasing the temperature at which the hot water is delivered. Additionally, it would be most advantageous for such system to be adaptable to existing water heater configurations and further to be retrofitable to existing water heaters.

SUMMARY OF THE INVENTION

The present invention overcomes the shortcomings of previously used approaches for enhancing the ability of a water heater of given tank volume and burner size to supply hot water. Moreover, the device of the present invention serves to increase the volume of hot water that is available without an increase in the maximum water temperature that is supplied to the point of usage. Alternatively, the present invention may be configured to supply hot water at two temperatures, a very high temperature for usage in for example a dishwasher or washing machine where there is little likelihood of direct contact with a user, and a reduced temperature for usage where direct contact with a user routinely occurs such as in sinks, showers or bathtubs.

The present invention provides for the combination of a mixing valve with a water heater to automatically combine hot water issuing from the water heater with cold water to yield an output at a constant temperature. As a result, the heater may be set to a significantly higher temperature without an increase in the water temperature that is routed to the various points of usage where additional cold water is combined with the mixed water to arrive at a desired temperature. By maintaining the water contained within the water heater at a higher temperature, more hot water at the regulated temperature is ultimately available for use. Additionally, the valve may be configured to supply both unmixed hot water exclusively for use through certain dedicated distribution lines to for example a dishwasher or washing machine, while mixed water at a lower temperature is available for uses where a user will come in direct contact with the water.

Additional advantages associated with the system of the present invention include the fact that a variably positionable gas control valve is no longer required for regulating the temperature of the water within the water heater as a single, high setting is all that is required. Additionally, while a gas control valve is typically configured to regulate the temperature of the water within the water heater to within±12° F. of the set temperature, the mixing valve of the present invention is able to regulate the output water temperature to within about±3° F. of the set temperature.

More particularly, the mixing valve used in the system of the present invention consists of a valve body that is attached directly to the water heater and in which the mixing of two water flows is controlled such that an output flow of a constant temperature is achieved. The valve may be controlled either by a mechanical device such as a wax pellet type thermostat or by an electronic device wherein a thermocouple is relied upon to feed back a temperature signal to a controller which operates a stepper motor with which the position of the valve is adjusted. The output from such valve is then distributed in the usual manner wherein an additional mixing with cold water is accomplished at the point of usage.

The valve may additionally have an unmixed hot water outlet through which very hot water is distributed to points of usage where no direct contact with the user is anticipated. Such devices may for example include dishwashers or clothes washers where the additional temperature is needed and a user is not normally in a position to come in contact with the water.

These and other features and advantages of the present invention will become apparent from the following detailed description of preferred embodiments which, taken in conjunction with the accompanying drawings, illustrate by way of example the principles of the invention.

DETAILED DESCRIPTION OF THE PREFERRED EMBODIMENTS

The present invention generally provides a hot water supply system wherein a mixing valve is combined with a water heater. The water within the water heater tank can thereby be maintained at a temperature much higher than usual, while the output of the system is regulated to a safer temperature level. As a result, a considerably greater volume of heated water is available for use.

Figure 1:
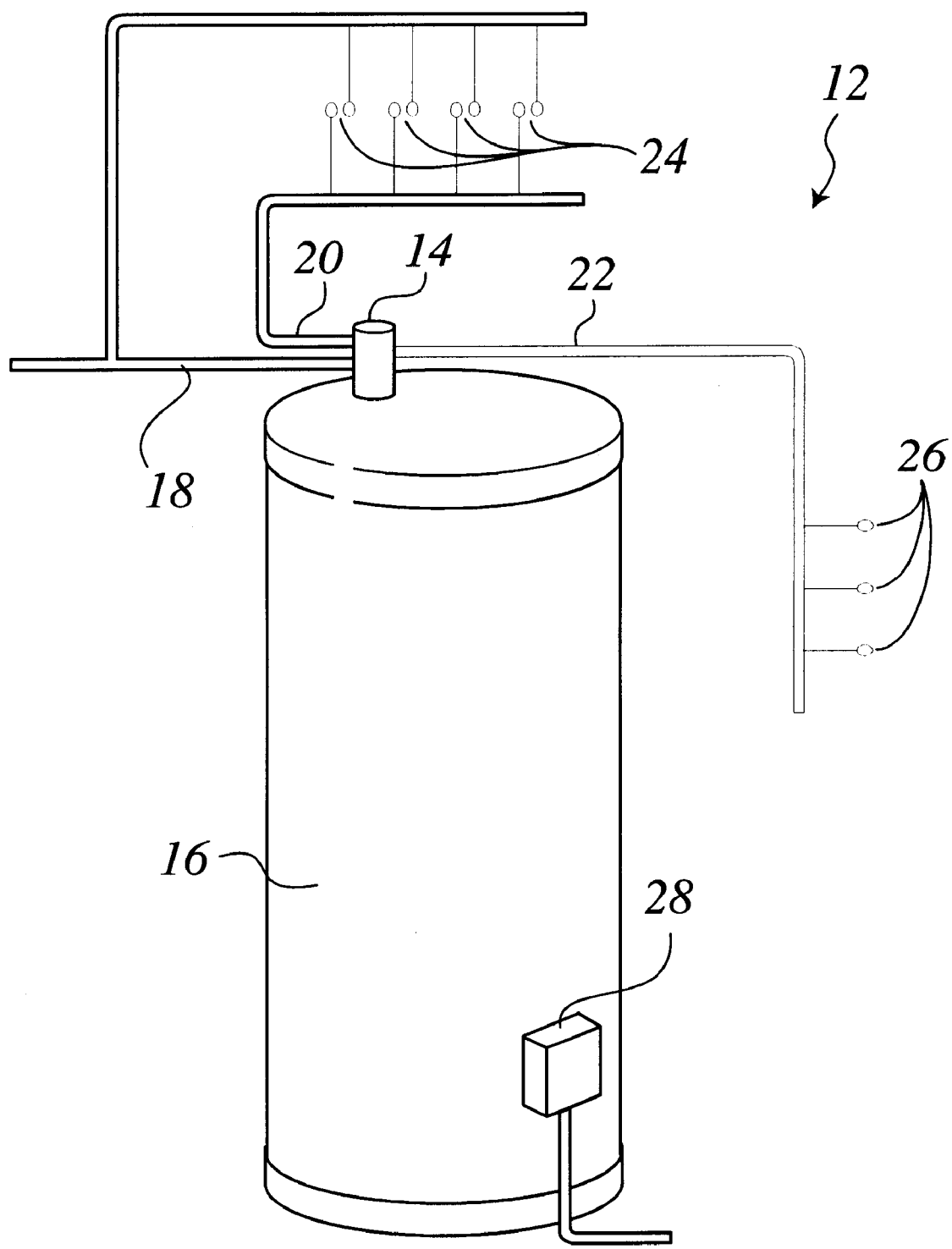
FIG. 1 is a schematic representation of the hot water supply system of the present invention.

FIG. 1 schematically illustrates a water heating system 12 of the present invention. A mixing valve 14 is shown attached to the water heater 16. A cold water line 18 feeds into the system and two hot water lines 20,22 are shown supplying heated water from the system to two separate distribution networks 24, 26. Water flowing through line 20 is supplied at a temperature sufficiently low to prevent accidental scalding and is distributed to for example sinks, showers and bathtubs where it mixed with more cold water to achieve the desired temperature. Water flowing through line 22 is substantially hotter and is distributed to for example dishwashers or clothes washing machines. The temperature of the water within the water heater is regulated by a thermostat that either controls the flow of gas to a burner or the flow of an electric current to a heating element.

Figure 2:
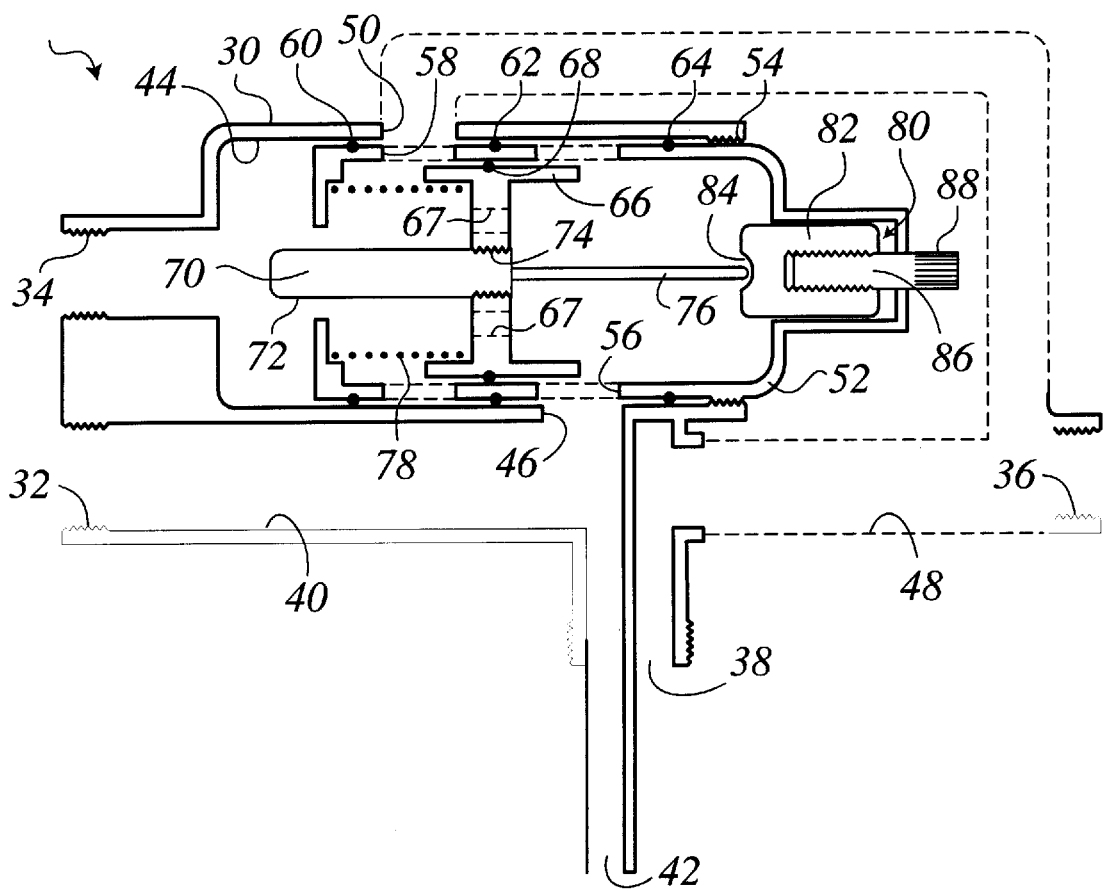
FIG. 2 is an enlarged, semi-schematic cross-sectional view of a first preferred embodiment of the mixing valve of the present invention.

FIG. 2 is a cross-sectional view of one embodiment of a mixing valve 14 for use in the water heating system of the present invention. The valve body 30 has formed therein an inlet for cold water 32, a first outlet 34 for a mixture of hot and cold water, a second outlet 36 for unmixed hot water and an coupling 38 for supplying cold water to and receiving heated water from water heater 16. The valve body has internal passages formed therein for conducting the flow of cold water, hot water and mixed water to various locations within the valve body. A first internal passage 40 conducts cold water from inlet 32 to the interior of the water heater via line 42 through coupling 38 and to the central cavity 44 of the valve body through a first port 46. A second internal passage 48 conducts hot water withdrawn from the water heater to the second outlet 36 and to the central cavity 44 through a second port 50 longitudinally offset relative to the first port. The second internal passage is represented by dotted lines to simplify the illustration as such passageway would in reality extend out of the plane of the illustration to the other side of the valve body. The first outlet 34 is disposed at the distal end of the central cavity.

The valve body 30 houses a cartridge 52 within the central cavity 44. Such cartridge is rigidly affixed to the valve body at its proximal end by any of various means including the threaded interconnection 54 that is shown. A number of apertures are formed in the cartridge to set its exterior into fluid communication with its hollow interior. A cold water apertures 56 allows cold water to enter the interior of the cartridge while a hot water aperture 58 allows hot water to enter. A series of O-rings 60, 62, 64 serve to prevent the flow of water between the exterior of the cartridge and the interior of the housing and thereby also prevents the mixing of hot and cold water prior to entry into the cartridge.

The cartridge 52 has a piston 66 slideably disposed therein that serves to control the flow of water through cold and hot water apertures 56, 58 into the interior of the cartridge. The piston is dimensioned such that a position in which it totally occludes one aperture causes the other aperture to be completely unobstructed and vice versa. An intermediate position will serve to partially obstruct both apertures. An O-ring 68 prevents the flow of water in the space between the exterior of the piston and the interior of the cartridge. Holes 67 formed in the piston permit the flow of water from one side of the piston to the other.

The position of the piston 66 is controlled by a wax pellet type sensor 70. Such senor generally consists of a rigid housing 72 filled with a quantity of paraffin that causes a plunger (not shown) to shift outwardly and retract inwardly as the paraffin expands and contracts as a function of its temperature. The housing is rigidly interconnected to the piston 66 as by for example a threaded interface 74, while a connecting rod 76 extends from the plunger to engage the proximal end of the cartridge. A spring 78 biases the piston toward the proximal end of the cartridge.

The point at which the connecting rod 76 engages the cartridge 52 is controlled by an adjusting mechanism 80. Such mechanism includes an internally threaded end piece 82 that is slideably received within the proximal end of the cartridge 52. A spherical depression 84 in its distal end is configured to receive the end of the connecting rod. A threaded shaft 86 is longitudinally affixed to the proximal end of the cartridge and is received within the end piece such that rotation of an externally accessible knob 88 allows the position of the end piece 82 and hence the connecting rod 76 and piston 66 to be shifted.

In use, cold water enters the valve body 30 via inlet 32 and flows through passageway 40 to fill the water heater via line 42. Additionally, cold water entering through inlet 32 will flow into the cartridge 52, via port 46 and aperture 56, past the piston through holes 67, past heat sensor 70 and out through outlet 34. Water heated by the water heater will flow through coupling 38, through passageway 48, into cartridge 52 through port 50 and aperture 58 and out past sensor 70 through outlet 34. If there is a demand for unmixed, hot water, the output from the water heater will flow out through outlet 36.

The position of the piston 66 will be determined by the temperature of the combination of hot and cold water flowing past the sensor 70 out of the cartridge 52 and through outlet 34. If the temperature of the water mixture rises above the set temperature, the paraffin within housing 72 will expand and cause the internal plunger to push the connecting rod 76 against the end piece 82. Since the position of the end piece is fixed, the piston will be caused to shift in a distal direction which serves to simultaneously increase the area of the cold water aperture 56 and decrease the area of the hot water aperture 58. The resulting water mixture will contain more cold water and less hot water and thus the resulting temperature will be reduced. If on the other hand the temperature of the water mixture drops below the set temperature, the paraffin within housing 72 will contract causing the internal plunger and connecting rod 76 to retract and move away from the end piece 82 allowing the spring 78 to push the piston 66 in a proximal direction. The size of the cold water aperture 56 will thereby be reduced while the size of the hot water aperture 58 will be increased to raise the amount of cold water and thus lower the temperature of the resulting mixture. In order to change the set temperature that is to be maintained by the thermostat mechanism, the knob 88 is rotated to shift the position of the end piece. A shift toward outlet 34 increases the amount of cold water and decreases the amount of hot water that is admitted into the cartridge 52 to reduce the mixture temperature. A shift in the opposite direction increases the amount of hot water and decreases the amount of cold water that is admitted into the cartridge to reduce the mixture temperature. The knob 88 may be calibrated directly in terms of the set temperature.

Figure 3:
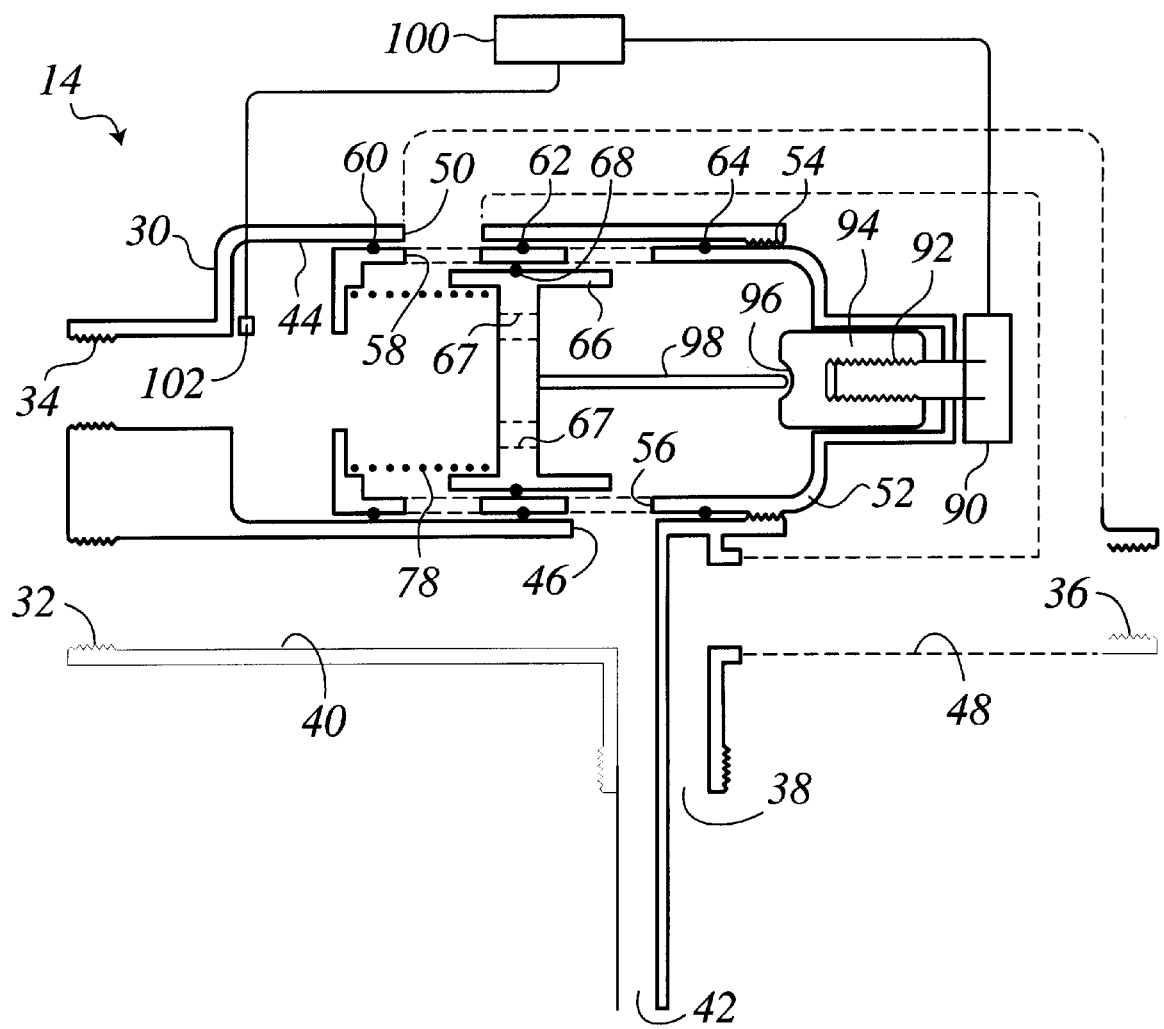
FIG. 3 is an enlarged, semi-schematic cross-sectional view of a second preferred embodiment of the mixing valve of the present invention.

FIG. 3 is a semi-schematic, cross-sectional view of another embodiment of a mixing valve 14 for use in the water heating system of the present invention. The figure illustrates a mixing valve for use in the water heating system of the present invention wherein the paraffin type temperature thermostat is replaced by a electronic means to sense the temperature and electric means to adjust the valve. The valve body 30 has formed therein an inlet for cold water 32, a first outlet 34 for a mixture of hot and cold water, a second outlet 36 for unmixed hot water and a coupling 38 for supplying cold water to and receiving heated water from water heater 16. The valve body has internal passages formed therein for conducting the flow of cold water, hot water and mixed water to various locations within the valve body. A first internal passage 40 conducts cold water from inlet 32 to the interior of the water heater via line 42 through coupling 38 and to the central cavity 44 of the valve body through a first port 46. A second internal passage 48 conducts hot water withdrawn from the water heater to the second outlet 36 and to the central cavity 44 through a second port 50 longitudinally offset relative to the first port. The second internal passage is represented by dotted lines to simplify the illustration as such passageway would in reality extend out of the plane of the illustration to the other side of the valve body. The first outlet 34 is disposed at the distal end of the central cavity.

The valve body 30 houses a cartridge 52 within the central cavity 44. Such cartridge is rigidly affixed to the valve body at its proximal end by any of various means including the threaded interconnection 54 that is shown. A number of apertures are formed in the cartridge to set its exterior into fluid communication with its hollow interior. A cold water apertures 56 allows cold water to enter the interior of the cartridge while a hot water aperture 58 allows hot water to enter. A series of O-rings 60, 62, 64 serve to prevent the flow of water between the exterior of the cartridge and the interior of the housing and thereby also prevents the mixing of hot and cold water prior to entry into the cartridge.

The cartridge 52 has a piston 66 slideably disposed therein that serves to control the flow of water through cold and hot water apertures 56, 58 into the interior of the cartridge. The piston is dimensioned such that a position in which it totally occludes one aperture causes the other aperture to be completely unobstructed and vice versa. An intermediate position will serve to partially obstruct both apertures. An O-ring 68 prevents the flow of water in the space between the exterior of the piston and the interior of the cartridge. Holes 67 formed in the piston permit the flow of water from one side of the piston to the other.

The position of the piston 66 is controlled by a stepper motor 90. Such motor rotates a threaded shaft 92 that is received within an internally threaded end piece 94. A spherical depression 96 in its distal end engages a connecting rod 98 that is attached to the piston 66. A spring 78 biases the piston toward the proximal end of the cartridge. Rotation of the stepper motor in one direction causes the piston to be pushed toward the distal end of the cartridge. Rotation in the opposite direction causes the end piece to be shifted away from the connecting rod which allows the spring 78 to shift the piston in the proximal direction.

The operation of the stepper motor 90 is controlled by the output of the controller 100 in response to a temperature signal generated by thermocouple 102. The temperature of the water mixture exiting the through outlet 34 is measured by the thermocouple and compared to a set temperature that had been entered. If the measured temperature is greater than the set temperature, the stepper motor is caused to rotate so as to cause the piston 66 toward the distal end of the cartridge. If the measured temperature is less than the set temperature, the stepper motor is caused to rotate in the opposite direction.

In use, cold water enters the valve body 30 via inlet 32 and flows through passageway 40 to fill the water heater via line 42. Additionally, cold water entering through inlet 32 will flow into the cartridge 52, via port 46 and aperture 56, past the piston through holes 67, past thermocouple 102 and out through outlet 34. Water heated by the water heater will flow through coupling 38, through passageway 48, into cartridge 52 through port 50 and aperture 58 and out thermocouple 102 through outlet 34. If there is a demand for unmixed, hot water, the output from the water heater will flow out through outlet 36.

The position of the piston 66 will be determined by the temperature of the combination of hot and cold water flowing past the thermocouple 102 out of the cartridge 52 and through outlet 34. The signal generated by the thermocouple is constantly compared to the set temperature by the controller 100. In the event the measured temperature is perceived to be greater than the set temperature, a signal is sent by the controller to the stepper motor 90 so as to cause it to rotate in a direction that results in a shifting of the piston in a distal direction. This will cause the size of the hot water aperture 58 to decrease and the size of the cold water aperture 56 to increase to thereby increase relative amount of cold water in the mixture. Conversely, if the measured temperature is perceived to be lower than the set temperature, the stepper motor is rotated to shift the end piece 94 away from the connecting rod 98 and thus allow the spring 78 to shift the piston in a proximal direction. The size of the cold water aperture 56 will as a result be reduced while size of the hot water aperture 58 will be increased to thereby increase the relative quantity of cold water in the mixture and thereby reduce the mixture temperature.

Either of the mixing valve embodiments described above enable the system of the present invention to supply a large quantity of hot water at safe temperature. By regulating the temperature of the water within the water heater 16 to 180° F. and setting the mixing valve 14 to 140° F., 140° F. water is available with a variation of only about±3° F. Moreover, as hot water is withdrawn from inside the water heater and is replaced by cold water, the burner will ignite, or the electric element will be energized, long before the temperature of the water within the heater drops below the 140° F. set temperature to thereby begin the recovery process well before the temperature of the hot water supply drops below the set temperature. Additionally, if very hot water is needed, such as for dishwashing or clothes washing, the mixing valve is bypassed and hot water is supplied directly from the water heater regulated to 180° F. via outlet 36.

While the mixing valve may be configured to interface with the water through a single coupling 38, and a simplified non-adjustable gas valve may be employed to regulate the temperature of the water and thus reduce costs, it is readily possible to configure a mixing valve so as to be adaptable to existing water heater and plumbing configurations wherein the mixing valve couples directly to the hot water output of the water heater while the incoming cold water line supplying the water heater is simply Teed to additionally supply the cold water inlet of the mixing valve. As such, the valve may be retrofitted to existing installations and only requires the gas valve of such a water heater to be turned up beyond the normal setting.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A water heating system, comprising:
   a water heater for heating water to a preselected first temperature;
   a mixing valve for combining heated water received from the water heater with cold water so as to yield a mixture at a preselected second temperature; and a first distribution system for distributing said mixture to points of usage for further combination with cold water.

2. The water heating system of claim 1, further comprising a second distribution system for distributing unmixed water directly from said water heater.

3. The water heating system of claim 1, wherein said mixing valve employs a mechanical device for maintaining said preselected second temperature.

4. The water heating system of claim 1, wherein said mixing valve employs an electronic device for maintaining said preselected second temperature.

5. The water heating system of claim 1, wherein said mixing valve comprises:

a first inlet port for receiving heated water from said water heater;

a second inlet port for receiving unheated water from a conduit supplying said water heater;

a first outlet port for supplying said distribution system with a mixture of water received through said first and second inlet ports; and means for controlling the mixing of water received through said first and second inlet port so as to maintain a constant temperature through said outlet port.

6. The water heating system of claim 5, wherein said mixing valve comprises:

a hollow cartridge having apertures formed therein for admitting cold water and heated water into its interior;

a piston slideably disposed within said cartridge and configured to variably obscure said apertures as a function of its position within said cartridge; and a mechanism for positioning said piston as a function of the temperature of the mixture of cold and heated water admitted past said apertures.

7. The water heating system of claim 6, wherein said mechanism comprises:

a wax pellet type sensor which extends and retracts a plunger as wax contained within said pellet expands upon heating and contracts upon cooling.

8. The water heating system of claim 7, where said positioning mechanism is configured to cause said wax pellet type sensor to push said piston as the wax contained within said pellet expands upon heating.

9. The water heating system of claim 8, further comprising a return spring that shifts said piston as wax contained within said pellet contracts upon cooling.

10. The water heating system of claim 6, wherein said positioning mechanism allows said preselected second temperature to be altered.

11. The water heating system of claim 10, wherein said positioning mechanism enables the distance between an interior wall of said cartridge and said piston to be adjusted.

12. The water heating system of claim 6, wherein said mechanism comprises a stepper motor.

13. The water heating system of claim 12, wherein said mechanism further comprises a thermocouple positioned to sense the temperature of the mixture of cold and heated water.

14. The water heating system of claim 13, wherein said mechanism further comprises a controller configured to receive a temperature related signal generated by said thermocouple, compare such signal to a preprogrammed set temperature signal and energize said stepper motor in accordance with any difference between signals.

15. The water heating system of claim 14, wherein said mechanism is configured such that said motor shifts said piston in order to decrease the temperature of the mixture of cold and heated water.

16. The water heating system of claim 15, wherein said mechanism is configured such that a return spring shifts said piston in order to increase the temperature of the mixture of cold and heated water.

17. The water heating system of claim 1, wherein cold water is introduced into said water heater through a passageway formed in said mixing valve.

18. The water heating system of claim 17, wherein cold water passes into said water heater and is withdrawn from said water heater through a single orifice formed in said water heater.

19. The water heating system of claim 1, wherein said preselected second temperature is adjustable.

20. The water heating system of claim 1, wherein said preselected first temperature is not adjustable.

* * * * *